(12) United States Patent
Patmont

(10) Patent No.: US 6,640,920 B1
(45) Date of Patent: Nov. 4, 2003

(54) LOW EMISSION EXHAUST SYSTEM FOR A MOTORIZED SCOOTER

(75) Inventor: Steven J. Patmont, Pleasanton, CA (US)

(73) Assignee: Patmont Motor Werks, Pleasanton, CA (US)

( * ) Notice: Subject to any disclaimer, the term of this patent is extended or adjusted under 35 U.S.C. 154(b) by 0 days.

(21) Appl. No.: 10/151,367

(22) Filed: May 16, 2002

(51) Int. Cl.[7] ............................................. A63C 17/12
(52) U.S. Cl. ........................ 180/181; 180/309; 180/89.2
(58) Field of Search .................................. 180/180, 181, 180/65.5, 205, 206, 207, 220, 221, 65.1, 309, 296, 225, 89.2; 60/272, 324

(56) References Cited

U.S. PATENT DOCUMENTS

| 4,457,663 | A |   | 7/1984  | Hems et al. |         |
|-----------|---|---|---------|-------------|---------|
| 4,461,609 | A |   | 7/1984  | Zinno       |         |
| 4,483,653 | A |   | 11/1984 | Waite       |         |
| 4,671,730 | A |   | 6/1987  | Gateau      |         |
| 4,821,832 | A |   | 4/1989  | Patmont     |         |
| 4,898,508 | A |   | 2/1990  | Hayata      |         |
| 4,961,477 | A |   | 10/1990 | Sweeney     |         |
| 5,094,314 | A |   | 3/1992  | Hayata      |         |
| 5,291,959 | A |   | 3/1994  | Malblanc    |         |
| 5,293,950 | A |   | 3/1994  | Marliac     |         |
| 5,388,659 | A | * | 2/1995  | Pepe        |         |
| 5,695,021 | A |   | 12/1997 | Schaffner et al. |    |
| 5,849,251 | A | * | 12/1998 | Timko       |         |
| 6,095,274 | A | * | 8/2000  | Patmont     | 180/181 |
| 6,216,447 | B1| * | 4/2001  | Tikka       | 60/272  |
| 6,551,385 | B2| * | 4/2003  | Turner et al. |       |
| 6,564,894 | B1| * | 5/2003  | Ho          | 180/205 |

FOREIGN PATENT DOCUMENTS

| DE | 569188 | 1/1933 |
| FR | 661602 | 7/1929 |

* cited by examiner

*Primary Examiner*—Brian L. Johnson
*Assistant Examiner*—Bryan Fischmann
(74) *Attorney, Agent, or Firm*—William Michael Hynes; Townsend and Townsend and Crew LLP

(57) ABSTRACT

A catalytic converter is especially adapted for placement to a motorized scooter. The scooter includes a front steered wheel, a rear driven wheel, and a structural tube extending between the wheels. A motor driving the rear driven wheel has an exhaust emission line. An exhaust tube having first and second open ends is provided. The exhaust tube is mounted through a sidewall of the main structural tube with a first end disposed exterior of the main structural tube and a second end discharging interiorly of the main structural tube. The exhaust tube has a catalytic converter preferably at the second end thereof. A flexible connection is provided between the exhaust emission of the motor and the first end of the exhaust tube. In operation, exhaust flows to heat the catalytic converter concentrically of the main structural tube and the converter operates exothermically at high temperature at the second end of the exhaust tube. Gas passing through the converter expands and cools, typically reverses flow about the exhaust tube, and discharges from the main structural tube. There results optimum catalytic operation, tamperproof location, optimum muffling, and safe heat discharge from the scooter body.

9 Claims, 5 Drawing Sheets

LOW EMISSION EXHAUST SYSTEM FOR A MOTORIZED SCOOTER

BACKGROUND OF THE INVENTION

In Patmont U.S. Pat. No. 4,821,832, issued Apr. 18, 1989, entitled Motor Scooter Having a Foldable Handle and Friction Drive, I disclosed utilizing the frame of a motor driven scooter as a muffler. Simply stated, such scooters have a forward steered wheel and a rear driven wheel with a structural tube extending therebetween. The structural tube supports a platform. A rider, utilizing an elongated steering handle extending from the steered wheel, stands on the platform and operates controls on the steering handle to a rear wheel driving motor to steer and drive the motorized scooter.

The motor is of a two-cycle variety having a relatively high emission content and a high noise level. In Patmont '832 it was disclosed to abate the noise level by passing gases from the engine through the tubular structure providing support for the platform between the front steered wheel and the rear driven wheel.

Modern pollution regulations, especially as enforced by The United States Government and the State of California, require pollution abatement from two-cycle engines. Such pollution abatement most conveniently occurs in catalytic converters. Catalytic converters must be heated for optimum catalytic conversion.

Motor driven scooters are a less than optimum location for properly operating catalytic converters. Such operating catalytic converters are hot, frequently operating in the range of about a thousand degrees Fahrenheit. The scooters when operated come into contact with their riders. For example, certain all-terrain scooters are used as both acrobatic and racing machines. In such use, all parts of the scooters come in contact with their riders. If the underside of such a scooter is hot, severe burning of the riding operator or other contestants can easily occur.

BRIEF SUMMARY OF THE INVENTION

A catalytic converter is especially adapted for placement to a motorized scooter. The scooter includes a front steered wheel, a rear driven wheel, and a structural tube extending between the wheels. A motor driving the rear driven wheel has an exhaust emission line. An exhaust tube having first and second open ends is provided. The exhaust tube is mounted through a sidewall of the main structural tube with a first end disposed exterior of the main structural tube and a second end discharging interiorly of the main structural tube. The exhaust tube has a catalytic converter preferably at the second end thereof. A flexible connection is provided between the exhaust emission of the motor and the first end of the exhaust tube. In operation, exhaust flows to heat the catalytic converter concentrically of the main structural tube and the converter operates exothermically at high temperature at the second end of the exhaust tube. Gas passing through the converter expands and cools, typically reverses flow about the exhaust tube, and discharges from the main structural tube. There results optimum catalytic operation, tamperproof location, optimum muffling, and safe heat discharge from the scooter body.

DESCRIPTION OF THE PREFERRED EMBODIMENTS

Figure 1:
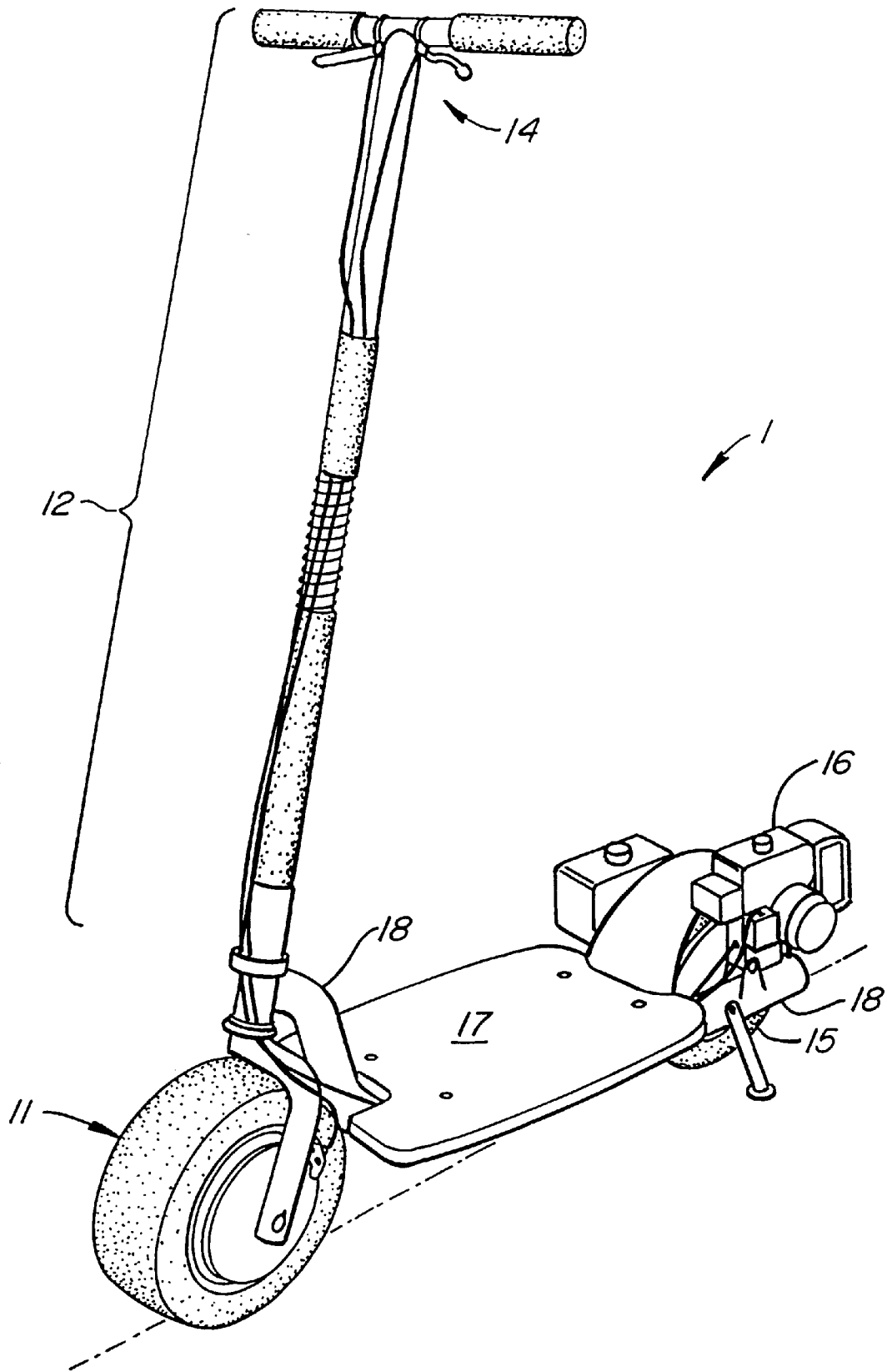
FIG. 1 is a perspective view of the scooter of this invention.

Referring to FIG. 1, the scooter 1 of this invention is illustrated in perspective. A front steered wheel 11 is at the bottom of an elongate steering handle 12. Steering handle 12 includes scooter controls 14. The rear driven wheel 15 has motor 16 for driving the rear driven wheel through rear driven wheel driving shaft 19 (see FIG. 3). The main structural tube 18 connects front steered wheel 11 and rear driven wheel 15 and provides support for platform 17.

Operation of the scooter 1 is easy to understand. A driver (not shown) stands on platform 17 and steers handle 12. This operator operates controls 14 to engage motor 16 at rear driven driving shaft 19 with rear driven wheel 15 to provide motive force to scooter 1. By pivoting engine 16 relative to main structural tube 18 and rear driven wheel 15 as well as by throttling engine 16, adjustable propulsion is provided to the scooter 1. Braking is provided from controls 14 at front steered wheel 11.

Figure 2:
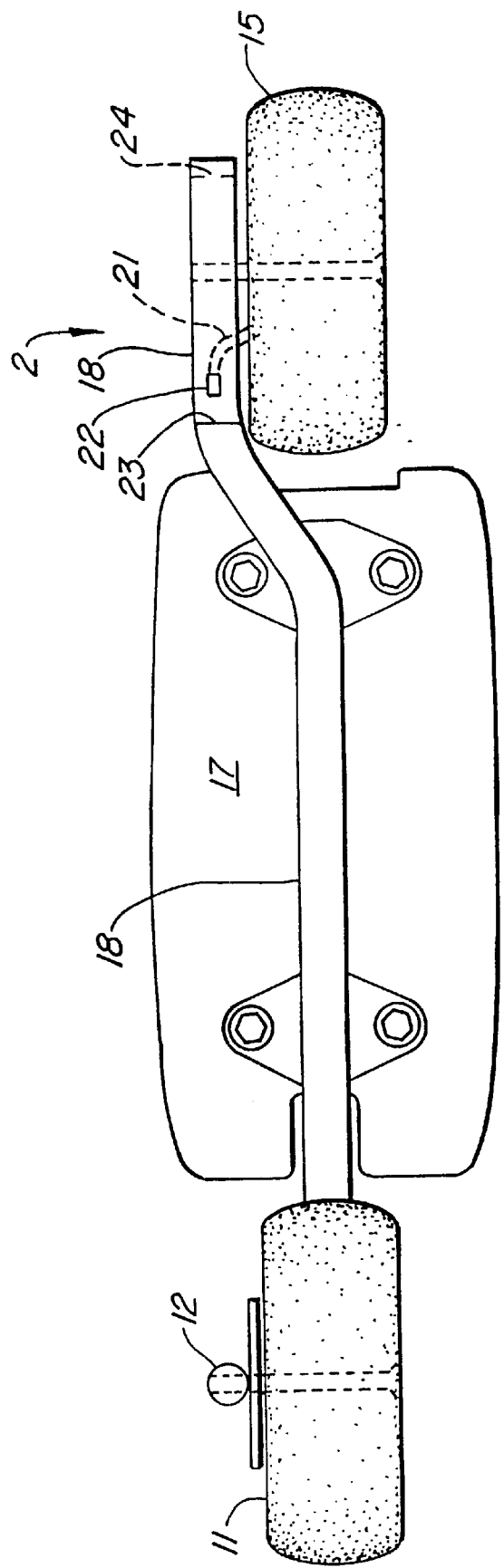
FIG. 2 is a bottom plan view illustrating in broken lines the central illustrated placement of the catalytic converter interior of the main structural tube for optimum catalytic operation, tamperproof location, optimum muffling, and safe heat discharge from the scooter body.

Referring to FIG. 2, main structural tube 18 is shown with an exhaust tube 21 passing through a side of the main structural tube to discharge exhaust interior of the main structural tube. A catalytic converter 22 is mounted interior of exhaust tube 21. Exhaust from motor 16 (not shown in FIG. 2) is discharged to exhaust tube 21 exterior of main structural tube 18 and heats catalytic converter 22. Exhaust, after passing through the exhaust tube 21 and the catalytic converter 22, discharges into the main structural tube 18 and impacts main structural tube at main structural tube barrier 23. In such discharge, the exhaust is expanded and cooled.

After impact with main structural tube barrier 23, the exhaust reverses flow around exhaust tube 21 and expands to cool, acting to cool the exhaust tube. Thereafter, the exhaust flows through exhaust port 24 in main structural tube 18 for a catalytically converted muffled discharge from the scooter 1.

Figure 3:
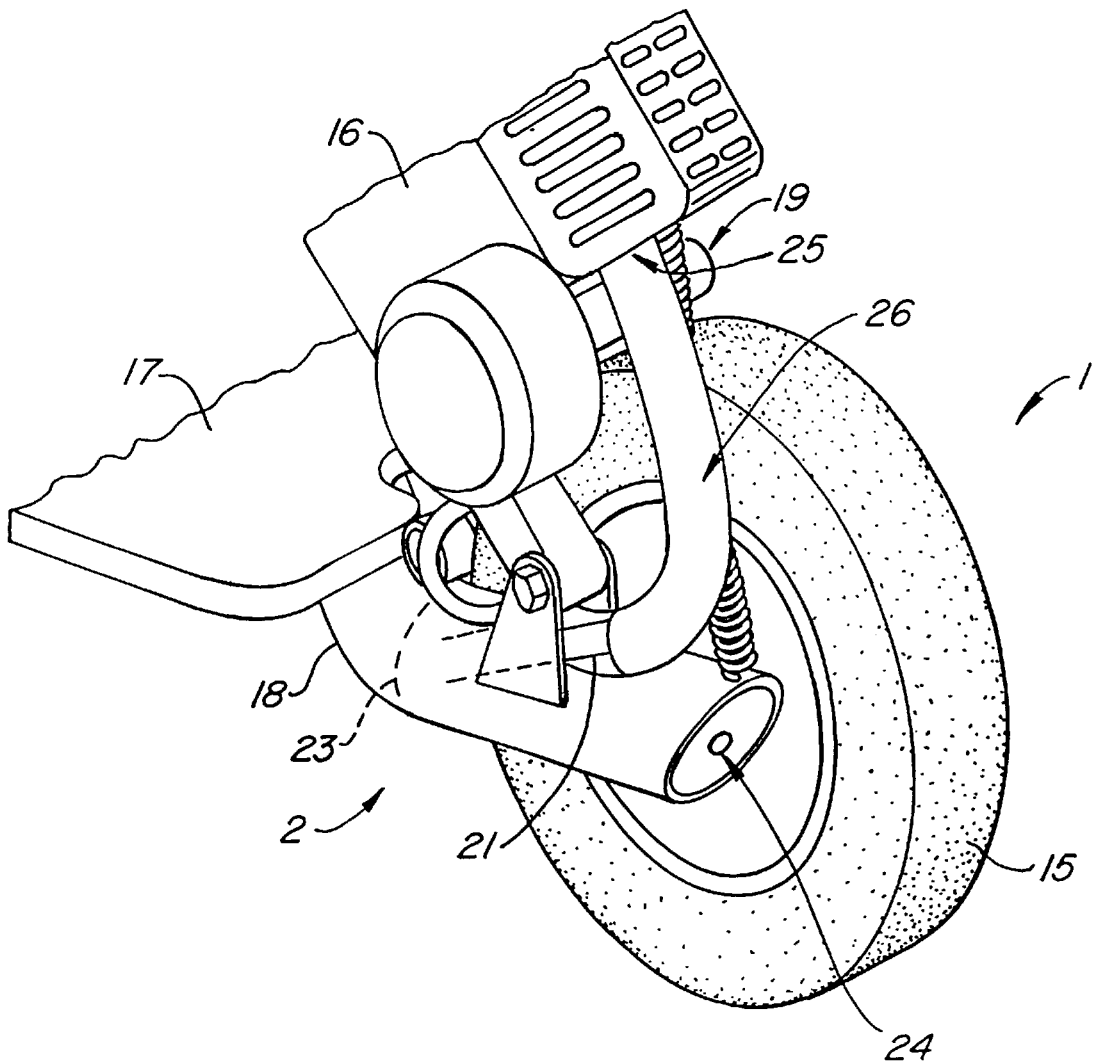
FIG. 3 is a perspective view of the motor exhaust conduit and its connection to the exhaust tube entering the main structural tube together with an illustrated port in the main structural tube for the discharge of catalytically cleaned and muffled exhaust from the engine; and, FIGS. 4A to 4D are a series of side elevation sections of the main structural tube illustrating alternate placements of the second end of the exhaust tube within the main structural tube as well as alternate placements for the catalytic converter.

Referring to FIG. 3, an expanded view of scooter 1 in the vicinity of rear driven wheel 15 is illustrated. Motor 16 includes an exhaust discharge 25. Exhaust discharge 25 is connected by flexible conduit 26 to exhaust tube 21. Flexible exhaust tube 26 is typically of silicone rubber having high heat resistance, low heat conductivity, and the requisite flexibility to allow motor 16 to pivot towards and away from rear driven wheel 15 at rear wheel driving shaft 19 to engage and disengage motor 16 from driving scooter 1.

Having set forth the operation of scooter 1 as well as the rudimentary connections of catalytic converter muffled exhaust 2 from the engine 16, the embodiments of the catalytic converter can be set forth with respect to FIGS. 4A through 4D.

Figure 4B:
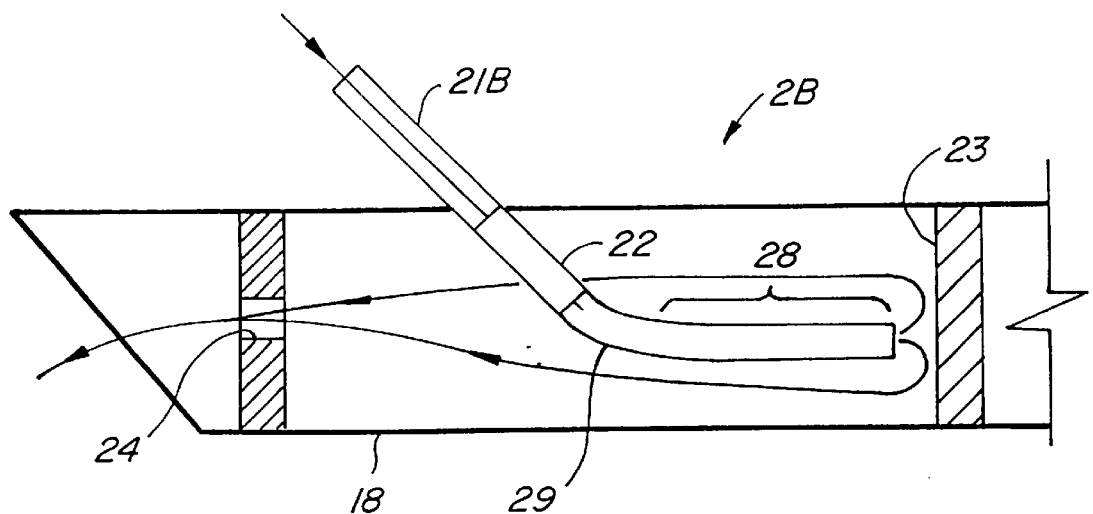
Figure 4A:
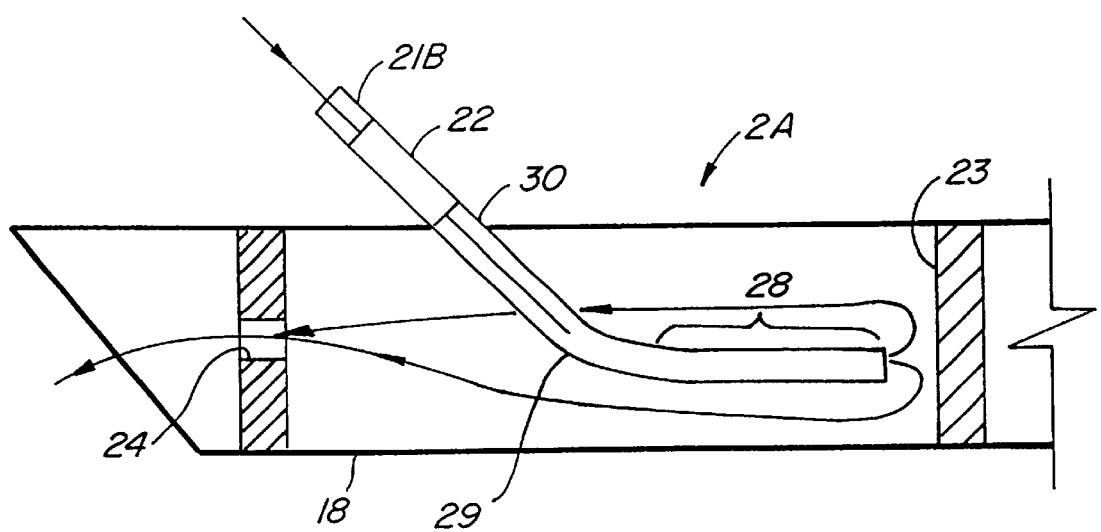

Referring to FIG. 4A, main structural tube 18 is shown with first exhaust tube 21B passing through the main structural tube at the main structural tube aperture 30. Thereafter the exhaust tube includes bend 29 and second concentric section 28, which section is concentric to main structural tube 18. Discharge of the exhaust from preferred exhaust tube 21A impacts main structural tube barrier 23 causing exhaust flow reversal. At the same time, exhaust expands and cools.

In the illustration of FIG. 4A, catalytic converter 22 mounts to first exhaust tube 21B exterior of the main structural tube 18, a mounting that is not preferred because the heated catalytic converter 22 is exterior of the main structural tube.

Referring to FIG. 4B, modification of the placement of catalytic converter 22 within first exhaust tube 21B has occurred. Catalytic converter 22 has been moved interior of structural tube 18 adjacent the open end of first exhaust tube 21B. This at least partially removes the danger of the catalytic converter 22 from heating first exhaust tube 21B to a point where it could contact and burn a driver.

Figure 4C:
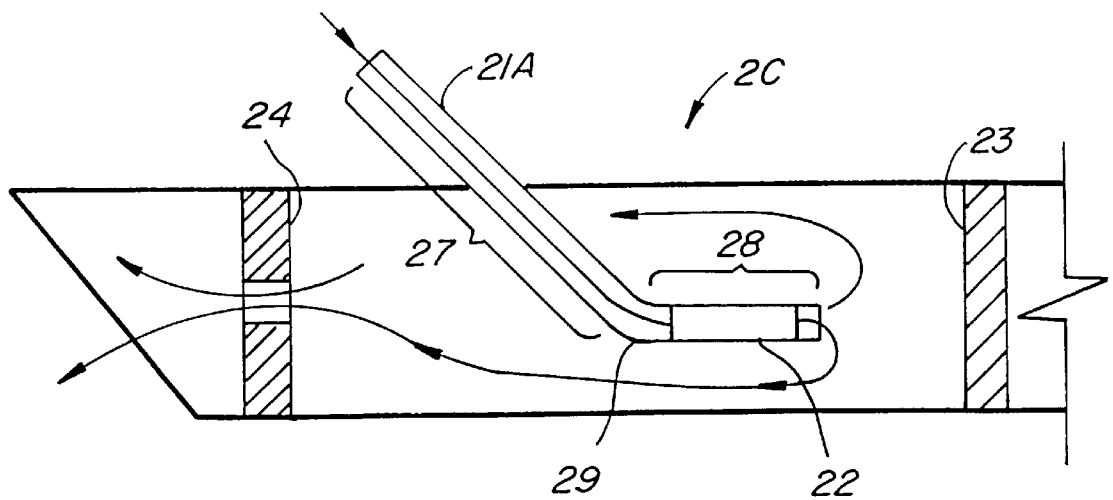

Referring to FIG. 4C, preferred exhaust tube 21A is illustrated. Preferred exhaust tube 21A transpierces main structural tube 18 at first angled section 27. Thereafter the exhaust tube includes bend 29 and second concentric section 28, which section is concentric to main structural tube 18. Discharge of the exhaust from preferred exhaust tube 21A impacts main structural tube barrier 23 causing exhaust flow reversal. At the same time, exhaust expands and cools. Several advantages are realized.

First, exhaust gas impact is to structural tube 18 at barrier 23. Assuming that barrier 23 is heated from the impact of the exhaust, the heat conductivity of barrier 23 will distribute this heat evenly about main structural tube 18. Even heat distribution will occur to the exterior of main structural tube 18 in a manner where the danger of burning a driver is quite reduced.

Second, it will be noted that catalytic converter 22 is placed within second concentric section 28 of preferred exhaust tube 21A. Concentric and reversed flow of the expanded and cooled exhaust about second concentric section 28 and its mounted catalytic converter 22 will further cool the exhaust tube at the catalytic converter.

Figure 4D:
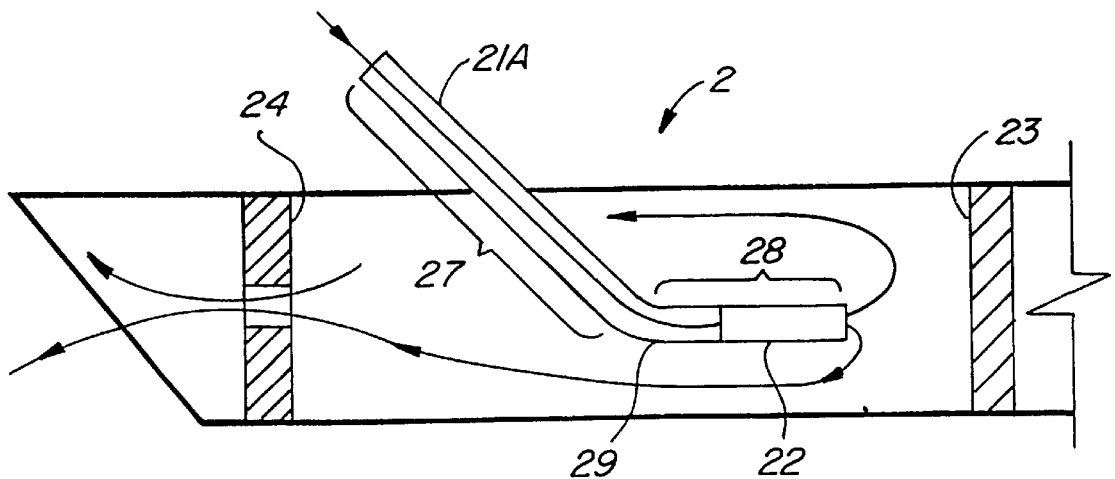

Referring to FIG. 4D, it will be seen that catalytic converter 22 has been moved to the discharge end of second concentric section 28. This has been found to be the optimum placement for the catalytic converter.

The exhaust tube is typically mounted by welding to the main structural tube to give a "tamperproof" mounting to the catalytic converter 22. Alternate mountings can occur so long as the resultant construction is maintained and applicable regulations relating to tampering with catalytic converters are complied with.

What is claimed is:

1. A motorized scooter exhaust system wherein the motorized scooter includes:
   a front steered wheel;
   a rear driven wheel;
   a structural tube extending between the front steered wheel and the rear driven wheel having a port for the discharge of exhaust;
   a motor driving the rear driven wheel having an exhaust emission; and,
   a connection between the exhaust emission of the motor and the structural tube for muffling exhaust emission from the motor through the port for the discharge of exhaust in the main structural tube;
   the improvement in the connection between the exhaust emission of the motor and the structural tube comprising in combination:
   an exhaust tube having first and second open ends;
   a catalytic converter mounted within the exhaust tube;
   a mounting of the exhaust tube through a sidewall of the main structural tube with a first end disposed exterior of the main structural tube and a second end discharging interiorly of the main structural tube, whereby exhaust emission from the motor passes through the catalytic converter into the interior of the main structural tube; and,
   the connection between the exhaust emission of the motor and the structural tube includes a connection to the exhaust tube.

2. The motorized scooter exhaust system according to claim 1 and wherein:
   the second end of the exhaust tube is concentric to the main structural tube.

3. The motorized scooter exhaust system according to claim 1 and wherein:
   the second end of the exhaust tube is mounted with respect to the main structural tube to cause gas flow reversal about and around the second end of the exhaust tube.

4. The motorized scooter exhaust system according to claim 1 and wherein:
   the catalytic converter is mounted at the second end of the exhaust tube.

5. The motorized scooter exhaust system according to claim 1 and wherein:
   the connection between the exhaust emission of the motor and the first end of the exhaust tube is a low-heat conductivity conduit.

6. The motorized scooter exhaust system according to claim 3 and wherein:
   a barrier is placed in the main structural tube beyond the discharge of exhaust from the exhaust tube; and,
   the port for discharging exhaust is located in the main structural tube remote from the exhaust tube and the barrier.

7. The motorized scooter exhaust system according to claim 1 and wherein:
   the connection between the exhaust emission of the motor and the first end of the exhaust tube is a flexible connection.

8. A process of installing a catalytic converter to a motorized scooter exhaust system wherein the motorized scooter includes:
   a front steered wheel;
   a rear driven wheel;
   a structural tube extending between the front steered wheel and the rear driven wheel having a port for the discharge of exhaust;
   a motor driving the rear driven wheel having an exhaust emission; and,
   a connection between the exhaust emission of the motor and the structural tube for muffling exhaust emission from the motor through the port for the discharge of exhaust in the main structural tube;
   the process of installing a catalytic converter in a tamperproof location comprising the steps of:
   providing an exhaust tube having first and second open ends;

providing a catalytic converter mounted within the exhaust tube;

mounting of the exhaust tube through a sidewall of the main structural tube with a first end disposed exterior of the main structural tube and a second end discharging interiorly of the main structural tube; and, installing a flexible connection between the exhaust emission of the motor and first end of the exhaust tube for the channeling of exhaust into the exhaust tube, whereby exhaust emission from the motor passes through the catalytic converter into the interior of the main structural tube.

9. The process of installing a catalytic converter to a motorized scooter exhaust system according to claim 8 comprising the further steps of:

placing a barrier in the main structural tube beyond the discharge of exhaust from the exhaust tube; and, locating the port for discharging exhaust in the main structural tube remote from the exhaust tube and barrier to cause gas flow reversal from the second end of the exhaust tube around the exhaust tube and out of the port in the main structural tube.

* * * * *